Patented Sept. 10, 1935

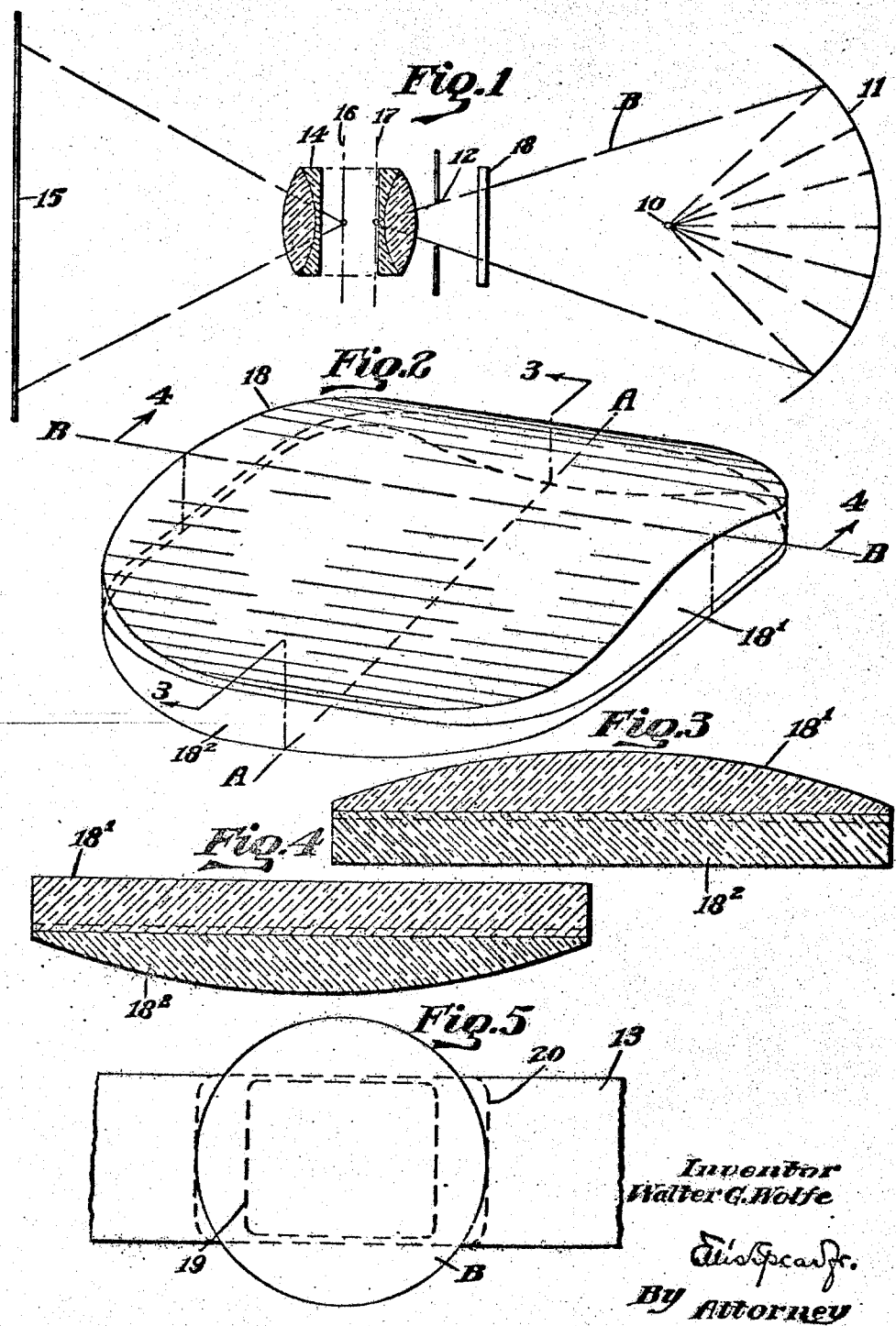

2,013,845

UNITED STATES PATENT OFFICE 2,013,845

ART OF PROJECTION

Walter G. Wolfe, Greenwood, Mass.

Application April 18, 1933, Serial No. 666,661

5 Claims. (Cl. 88—24)

In the modification of projected or photographic beams there is an insistent problem of conforming an emergent or accepted coincident to the mechanical contour of an image.

For example, the moving picture film presents a definitely proportioned object. This may be optically treated for observation.

In illuminating a motion picture screen or an enlarging screen for photographic enlargements, the ideal condition is a screen of equalized brilliancy throughout, that is to say with the margins of equal brilliancy with the center.

This condition has not heretofore been attained in the art.

When an illuminating beam is projected onto the surface of a film, it is necessary to condense the beam to a flat field at the picture aperture. Unless such condensing effect is uniform, the picture aperture is not evenly illuminated. Unless it is complete, illuminating efficiency is lost.

The condensing system generally used in the art consists of a pair of plano-convex spherical condensing lenses. These produce a circular beam varying from the center towards its margin. Such a beam results in an uneven concentration of light at the picture aperture. The picture aperture is intensely illuminated at the axial focal point of the beam with concentric falling off of illumination at the margin of the beam. Moreover, the circular beam overlaps the rectangular picture aperture with resultant loss of more than 50% in illuminating efficiency.

In the effort to avoid these objections, it has been proposed to use ellipsoidal reflectors. These produce an elongated beam which varies in intensity above and below a line across the picture aperture, and hence also fails to illuminate the screen with equalized brilliancy throughout. The ellipsoidal reflector does avoid to some extent the loss of illuminating efficiency which is characteristic of the spherical condensing lens.

My present invention, in its broadest aspect, contemplates a uniform illumination of equalized brilliancy throughout of the picture aperture without overlapping of beam and aperture and resultant loss of illuminating efficiency. This not only enables me to use a light source of less candle power than heretofore in the art, but to obtain with such more economical light source a far more uniformly brilliant illumination of the screen itself.

According to my invention, the beam is so condensed at the picture aperture as entirely to avoid formation of an intensely bright axial focal point with concentric falling off of illumination at the margin of the beam.

In carrying out my invention I may simply interpose between the light source and the picture aperture, preferably near the focus of the reflected beam, a toroidal condensing lens.

This impinges upon the picture aperture a spherical ellipsoidal beam.

Or I may interpose between the light source and the picture aperture a lens system consisting of two toroidal lenses of unequal power with axes crossing at right angles. These produce respectively vertical and horizontal fields which when properly constructed and focused impinge upon the picture aperture an approximately square or oblong focal beam.

Or I may interpose between the light source and the picture aperture a lens system consisting of either one or two aspheric-toroidal lenses, either in single element or combined as in the method outlined just above. These produce at the picture aperture substantially the same shape of beam as in said method just above.

Or I may attach to the shutter blades of the moving picture projector a number of lenses which may be either cylindrical, toroidal, or sphero-cylindrical, or sphero-toroidal, or aspheric-sphero-cylindrical-toroidal. The opaque spaces of the shutter synchronize with the intermittent motion of the film and the normally open spaces of the shutter are filled with my novel lenses, so that when a beam of light strikes the rapidly revolving shutter it is condensed at the focus of the shutter lenses onto the picture aperture in a succession of broad bright lines, the rapidity of revolution making one whole horizontal bright screen, and the persistence of vision making the successive bright bands appear as a continuous beam of white light.

With any and all of these methods the result is an illuminated screen in which the brilliancy of illumination is equalized throughout the entire area of the screen, instead of being concentrated at the center of the screen with gradual falling off of illumination towards the edges.

With any and all of these methods moreover, I avoid any loss of illuminating efficiency while, however, using a beam of less candle power than heretofore.

With any and all of these methods also the illuminating beam is so condensed as to produce either an approximately square or elongated rectangular focal point, depending upon whether or not the film to be illuminated is a silent film having no sound track or whether such film is a "talkie" having a sound track.

In the preferred embodiment of my invention illustrated herein my positive acting auxiliary lens is so ground as to provide ellipsoidal cylindrical surfaces of crossed axes and preferably also of different power whereby to produce diametrically opposite spread and concentration of the beam relative to the axis of crossing the lens.

I preferably construct the lens of fused quartz or pyrex glass because of its location at or approximately at the focal or burning point of the arc constituting the illuminating source for the film.

In the accompanying drawing I have illustrated somewhat diagrammatically the configuration and manner of use of such preferred embodiment of my invention.

Fig. 1 is a diagrammatic view of a conventional motion picture projection system equipped with a condensing lens in accordance with my invention, the parts being arranged in their correct relative positions but not being drawn to scale.

Fig. 2 is a perspective view showing my novel lens, removed.

Figs. 3 and 4 are sections on the lines 3—3 and 4—4 of Fig. 2, respectively, and Fig. 5 is a diagram illustrating the condensing effect of said lens on the light beam at the picture aperture, and showing in dotted lines, respectively, two adjustments of the condensed beam, one for silent films and the other for "talkies", dotted square field being for silent films and the oblong field for "talkies".

Referring to Fig. 1 I have indicated at 10 any suitable source of light and at 11 any suitable parabolic or other reflector for projecting the light rays as a conical beam through the usual picture aperture indicated at 12 whereby the film 13 travelling past said aperture is illuminated. Beyond the picture aperture 12 is arranged the usual projection lens system 14 for projecting the illuminated images in magnification upon the usual screen 15. The projection lens system 14 may be the usual "doublet" in which case the first nodal point is approximately at 16 and the second nodal point at 17.

According to my invention I interpose between the light source and the picture aperture a positive acting auxiliary lens 18. The purpose of such lens is to condense the normally circular illuminating beam B to an elliptical flat field so as to produce either an approximately square or oblong focal point at the picture aperture. This is indicated diagrammatically in Fig. 5 wherein the area 19 is approximately square and the area 20 is approximately oblong or in the form of an elongated rectangle. The condensing lens 18 is adjusted to produce one or the other of these two different focal areas, depending upon whether or not the film to be illuminated has or does not have a sound track.

The lens 18 itself includes ellipsoidal cylindrical surfaces of crossed axes and preferably of different power whereby to produce diametrically opposed spread and concentration relative to the axes of crossing in the lens. The respective components 18' and 18² of the lens 18 are toric surfaces of ellipsoidal cylinder and have their respective axes crossed at right angles as indicated at A—A and B—B. The cylindricity of the two torics is preferably of unequal power.

Preferably the lens 18 is of fused quartz, pyrex glass or some other heat resistant material in order to withstand the heat to which it is subjected by reason of its location at approximately the focal or burning point of the arc constituting the usual light source.

Referring more particularly now to the special construction and configuration of the lens element 18 and to the results which I obtain from the use of a lens having such construction and configuration.

The lens may consist of two plano-cylindrical lenses cemented or otherwise fastened together, or such surfaces may be combined in a single piece of optical glass.

Analyzing the effects obtained, I may explain that a toroidal surface alone gives a cylindrical beam. The cylindricity of this beam may be modified by combining with the toroidal surface a plano surface, in which case the beam becomes more nearly square. If the toroidal surface is combined with a negative spherical surface, the cylindrical beam is brought into even squarer form, and if such toroidal surface is combined with either a negative or a positive toroidal surface, and the axes of said surfaces are in opposite meridians, the cylindrical beam becomes practically a perfect square.

Still considering for the moment the cylindrical beam, the bundle of crossing rays beyond or within the focus is never spherical but is elliptical, even though the rays may not be truly elliptical. When two cylinders with axes parallel are combined, the result is a cylindrical lens having the sum of the two powers, but if the axes of these cylinders are turned at right angles to each other, the image becomes a sphere, the cylinders of crossed axis being the equivalent of a spherical lens. By making the crossed cylinders of unequal power, the image becomes an elongated sphere or an ellipse, and by making the cylindrical curvatures of the crossed cylinders somewhat aspheric, the curvature of the image can be broadened or narrowed.

Accordingly, by using opposed cylindrical surfaces of crossed axes, and preferably of unequal powers and by making these cylindrical surfaces of toric curve, I am able to modify the normally cylindrical beam to an approximately square or oblong focal area at the picture aperture.

In my lens, the toroidal curves of the opposing cylinders of crossed axes have different radii of curvatures. In one lens which I have constructed and which I have found satisfactory in use, the radius of curvature of one of the toroidal cylindrical surfaces was approximately 6".5 and had a focus of approximately 13". The radius of curvature of the companion opposing surface in such lens was approximately 5".25 and its focus approximately 7".5.

The surface of shorter radius gave a narrow line or band at its focus. That of longer radius gave a broader line or band at its focus.

When the two surfaces were opposed at right angles (either in one or two piece form) an elongated image of approximately square or oblong shape resulted.

The effect of the surface of longer radius was to squeeze in or condense the narrow band produced by the opposing surface of shorter radius, which band was merged with the broader band produced by the surface of the longer radius, the result being a rectangle when the opposing curves were properly balanced.

The radii of curvature of the lesser and greater curves of the respective toroidal surfaces were approximately radius 2".25, focus approximately 4".5 and radius approximately 1".1875 and focus approximately 3".75.

When the two toroidal curves were opposed, the radii are approximately 4".50 opposed to 3".75. When the two toroidal curves were at right angles, the radii are approximately 3".75 opposed to 4".50.

In some instances, as where the light beam is deformed by use of an ellipsoidal reflector or by a spherical reflector giving a distorted point source, it may be desirable to make the toroidal curves aspheric.

Thus by combining two opposing cylinders of crossed axes and of toroidal or even aspheric curvature, one with long radius giving a long focus in one meridian and the other of short radius giving a short focus in the other meridian, I obtain an approximately square focal point at the picture aperture.

I believe it to be new in the art to use positive toroidal curves on two opposing surfaces.

I also believe it to be new to use these curves in a condensing lens.

And I further believe it to be new to combine two opposed cylindrical surfaces in a condensing lens.

While I have discussed my invention as a lens system for equalizing the brilliancy of the illuminating beam in a motion picture projection apparatus by condensing it to a square beam at the picture aperture, it will be understood that this treatment is purely illustrative and in no way limiting, and that the principles of my invention apply to other fields of illuminated projection, as photograph enlarging screens, for example.

Various modifications in purpose, construction and method of application may obviously be resorted to within the spirit and scope of my invention as defined by the appended claims.

What I therefore claim and desire to secure by Letters Patent is:—

1. In a projection system in combination with the rectangular picture aperture, a light source, means for projecting a beam of circular cross section in line with said aperture, a projection lens system therefor, and a positive acting lens system disposed in the path of the beam in advance of said aperture and having in close juxtaposition a pair of cylindrical surfaces of crossed axes and of unequal curvatures, and of opposite effect and concentratively disposed with reference to the aperture and between the light source and said aperture and at a less distance therefrom than its focal length, whereby the illumination of said aperture by said beam is made substantially uniform by opposite distortions of the beam or axes at right angles to each other to effect the condensation of the beam in the shorter dimension of the aperture and a spread of the beam in the longer dimension of the aperture in substantial rectangular coincidence with the aperture opening and projected to the nodal point of the projection lens system.

2. In a projection system in combination with the rectangular picture aperture, a light source, means for projecting a beam of circular cross section in line with said aperture, a projection doublet therefor, and a positive acting lens system disposed in the path of the beam in advance of said aperture and having in close juxtaposition a pair of cylindrical surfaces of crossed axes and of unequal curvatures, and of opposite effect and concentratively disposed with reference to the aperture and between the light source and said aperture and at a less distance therefrom than its focal length, whereby the illumination of said aperture by said beam is made substantially uniform by opposite distortions of the beam or axes at right angles to each other to effect the condensation of the beam in the shorter dimension of the aperture and a spread of the beam in the longer dimension of the aperture in substantial rectangular coincidence with the aperture opening and projected to the second nodal point of the projection doublet.

3. In a projection system in combination with the rectangular picture aperture, a light source, means for projecting a beam of circular cross section in line with said aperture, a projection lens system therefor, and a positive acting lens system disposed in the path of the beam in advance of said aperture and consisting of a relatively thin unitary lens member having on its opposite faces cylindrical surfaces of crossed axes and of unequal curvatures, and of opposite effect and concentratively disposed with reference to the aperture and between the light source and said aperture and at a less distance therefrom than its focal length whereby the illumination of said aperture by said beam is made substantially uniform by opposite distortions of the beam or axes at right angles to each other to effect the condensation of the beam in the shorter dimension of the aperture and a spread of the beam in the longer dimension of the aperture in substantial rectangular coincidence with the aperture opening and projected to the nodal point of the projection lens system.

4. Projection optics for use in combination with the rectangular picture aperture of a moving picture projector having a high intensity light source and means for projecting a beam therefrom of circular cross section in line with said aperture, said optics comprising a heat resisting positive acting lens system disposable in the path of the beam in advance of said aperture and between the aperture and light source so as to be exposed to the intense heat thereof, and consisting of a relatively thin unitary quartz glass lens member having on its faces cylindrical surfaces of crossed axes and of unequal curvatures, and of opposite effect and concentratively disposable in the projector axis with reference to the aperture and between the light source, and said aperture and at a less distance therefrom than its focal length whereby the illumination of said aperture by said beam from a high intensity source may be made substantially uniform by immediate opposite distortions of the beam or axes at right angles to each other to effect the condensation of the beam in the shorter dimension of the aperture and a spread of the beam in the longer dimension of the aperture in substantial rectangular coincidence with the with the aperture opening and projected to the nodal point of the projection lens system.

5. Projection optics for use in combination with the rectangular picture aperture of a moving picture projector having a high intensity light source and means for projecting a beam therefrom of circular cross section in line with said aperture, said optics comprising a heat resisting positive acting lens system disposable in the path of the beam in advance of said aperture and between the aperture and light source so as to be exposed to the intense heat thereof and consisting of a relatively thin unitary quartz glass lens member having on its opposite faces toric cylindrical surfaces of crossed axes and of unequal curvatures, and of opposite effect and concentratively disposable in the projector axis with reference to the aperture and between the light source and said aperture and at a less distance therefrom than its focal length, whereby the illumination of said aperture by said beam from a high intensity source may be made substantially uniform by immediate opposite distortions of the beam or axes at right angles to each other to effect the condensation of the beam in the shorter dimension of the aperture and a spread of the beam in the longer dimension of the aperture in substantial rectangular coincidence with the aperture opening and projected to the nodal point of the projection lens system.

WALTER G. WOLFE.